United States Patent [19]
Yamamoto

[11] Patent Number: 6,128,160
[45] Date of Patent: Oct. 3, 2000

[54] HEAD DEVICE HAVING SPIN-VALVE READ HEAD FOR USE IN A DISK STORAGE APPARATUS

[75] Inventor: Kotaro Yamamoto, Tokyo, Japan

[73] Assignee: Kabushiki Kaisha Toshiba, Kawasaki, Japan

[21] Appl. No.: 09/066,102

[22] Filed: Apr. 24, 1998

[30] Foreign Application Priority Data

Jun. 30, 1997 [JP] Japan ................................ 9-174193

[51] Int. Cl.[7] .............................. G11B 5/33; G11B 5/03
[52] U.S. Cl. .......................................... 360/113; 360/66
[58] Field of Search .................................. 360/113, 66

[56] References Cited

U.S. PATENT DOCUMENTS

| | | | |
|---|---|---|---|
| 5,650,887 | 7/1997 | Dovek et al. | 360/75 |
| 5,748,399 | 5/1998 | Gill | 360/66 |
| 5,903,415 | 5/1999 | Gill | 360/113 |
| 5,998,993 | 12/1999 | Inage et al. | 324/210 |

FOREIGN PATENT DOCUMENTS

| | | |
|---|---|---|
| 6-314417 | 11/1994 | Japan . |
| 9-35213 | 2/1997 | Japan . |
| 7-309080 | 6/1997 | Japan . |

*Primary Examiner*—W. Chris Kim
*Attorney, Agent, or Firm*—Finnegan, Henderson, Farabow, Garrett & Dunner, L.L.P.

[57] ABSTRACT

A read head of a head device used in a disk storage apparatus is provided including a spin-valve magnetoresistive (MR) element. The spin-valve MR element comprises a pinning magnetic layer of which magnetizing direction is determined, a free magnetic layer of which magnetizing direction can be shifted by a signal magnetic field derived from the disk, and a non-magnetic layer sandwiched between the pinning magnetic layer and the free magnetic layer. The head also includes a remagnetization layer which functions as a control element for correcting the magnetizing direction of the pinning magnetic layer.

6 Claims, 13 Drawing Sheets

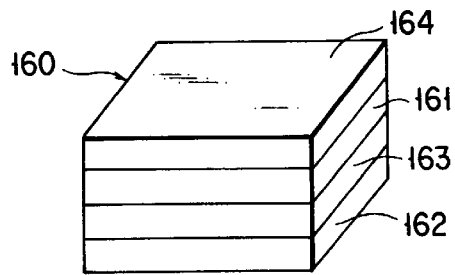
FIG. 16
PRIOR ART
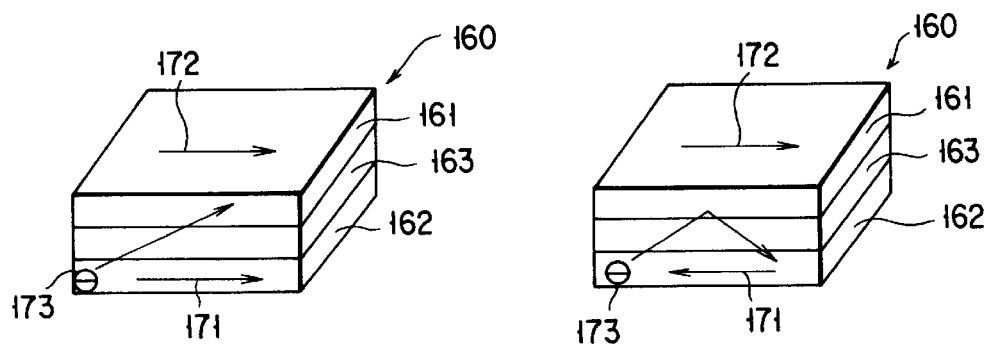
FIG. 17A
PRIOR ART
FIG. 17B
PRIOR ART
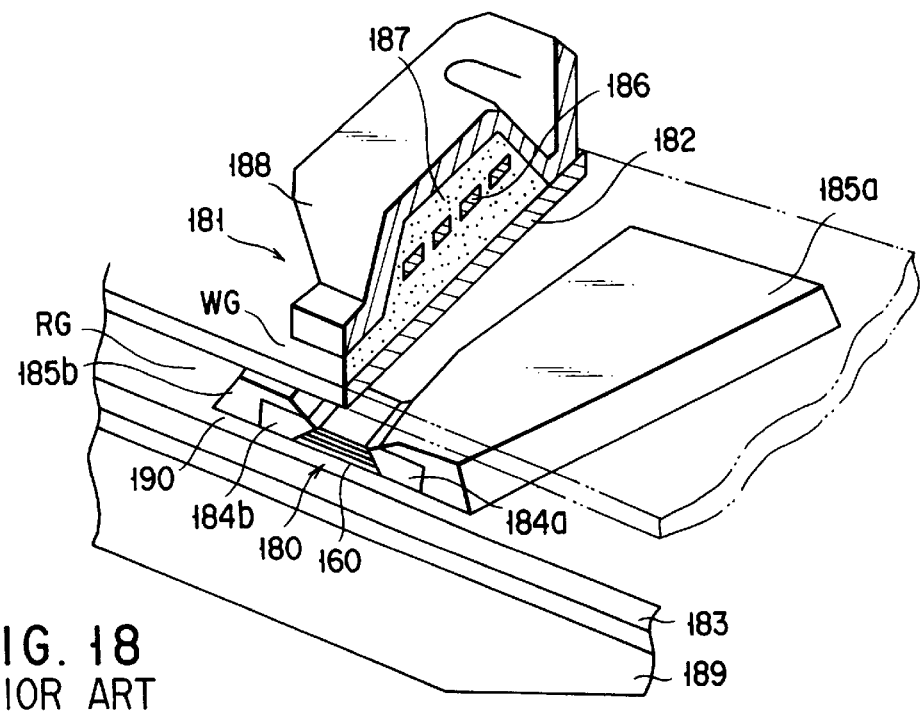
FIG. 18
PRIOR ART

HEAD DEVICE HAVING SPIN-VALVE READ HEAD FOR USE IN A DISK STORAGE APPARATUS

BACKGROUND OF THE INVENTION

The present invention relates to a head device for use in a magnetic disk storage apparatus and particularly, a read head provided with a spin-valve magnetoresistive (MR) element.

Recently, a hard disk drive (HDD) includes a head for reading and writing data on a disk(s) which comprises a write head incorporating an inductive film head and a read head incorporating an MR (magnetoresistive) head.

The MR head includes an MR element having a magnetoresistive effect to a magnetic field (the signal magnetic field derived from a disk) and thus has several times characteristic higher in the reproducing output than an inductive film head. Recently, an improved type of the MR head has been focused including a spin-valve MR element is provided with spin-valve layers. Such an improved MR head is known as a GMR (giant magnetoresistive) head.

Referring to FIG. 16, a spin-valve layer structure 160 is made of a four-layer construction. More specifically, a non-magnetic layer (a conductive layer) 163 is sandwiched between two magnetic layers 161 and 162 and an antiferromagnetic layer 164 also called an exchange layer is provided on the magnetic layer 161. The antiferromagnetic layer 164 has a function for determining the magnetization of the magnetic layer 161 in one direction. The magnetic layer 161 is thus called a pinning layer. The magnetic layer 162 is a soft magnetic layer of which magnetizing direction is determined by an external signal magnetic field from the outside (namely, a disk) and also called a free layer (or a magnetic field detecting layer).

The principle of action in the spin-valve layer 160 is explained referring to FIGS. 17A and 17B.

As shown in FIG. 17A, the spin-valve layer 160 produces a parallel magnetizing alignment where the magnetizing direction 171 of the free layer 162 aligns with the magnetizing direction 172 of the pinning layer 161. In the alignment, electrons 173 can freely travel between the free layer 162 and the non-magnetic layer 163 thus decreasing the overall resistance of the spin-valve layer 160. Also, there is produced an antiparallel magnetizing alignment where the magnetizing direction 171 of the free layer 162 is opposite to the magnetizing direction 172 of the pinning layer 161, as shown in FIG. 17B. In this case, the electrons 173 are dispersed between the free layer 162 and the non-magnetic layer 163, hence sharply increasing the overall resistance of the spin-valve layer 160. Accordingly, a rate of resistance change (a resistance change rate) is increased to several times higher than that of a conventional (form anisotropic) MR head, which is known as a GMR effect. The spin-valve layer 160 having such a GMR effect is now favorable for use as a primary element in a next-generation MR head (or a GMR head) for recording and reproducing a high density record.

FIG. 18 is a schematic view of a normal arrangement of a read/write head 2 using the spin-valve layer 160. The read/write head comprises mainly of a read head 180 and a write head 181 mounted separately. The read head 180 is a GMR head having the spin-valve layer 160. The spin-valve layer 160 is sandwiched between an upper shield member 182 and a lower shield member 183 for protection from the magnetic fields generated by adjacent data. The upper shield member 182 also functions as a lower electrode for the write head 181 as explained later. The distance between the two shield members 182 and 183 is a read gap RG of the read head 180. In addition, a pair of hard magnets 184a and 184b are provided with ferromagnetic layers (or semi-ferromagnetic layers) for determining the magnetization of the free layer 162 in one direction, on both sides of the spin-valve layer 160. The spin-valve layer 160 is connected by the hard magnets 184a and 184b to leads 185a and 185b respectively.

The write head 181 includes a coil 186 made of a spiral pattern form of a conductive material. The pattern form of the coil 186 is encapsulated by an insulating material 187 such as alumina ($Al_2O_3$). The coil 186 generates a magnetic field across a write gap WG, when supplied with a (write) current for data write action. A ring by the coil 186 extends through a tubular space defined by an upper electrode 188 and the lower electrode (or the upper shield member of the read head 180) 182. The foregoing element structure is fabricated by a head manufacturing process in which a thin film forming method is applied on a substrate 189 of the head forming a slider.

For using the read/write head as a magnetic head device in an HDD, it is desired that the resistance change in the spin-valve layer 160 of the read head is proportional to a leak magnetic flux (of the signal magnetic field) from a disk or a magnetic storage medium in the HDD (see the H-R characteristic curve shown in FIG. 19). As shown in FIG. 19, the read head having the spin-valve layer 160 is designed so that the magnetizing direction 201 of the pinning layer 161 is vertical to (a signal magnetic field 190 of) the disk located in its opposite position and the magnetizing direction 202 (at the initial state) of the free layer 162 is parallel to the disk, producing an orthogonal magnetizing alignment state (referred to as HEAD-A). More particularly, the magnetizing directions 201 and 202 of the two layers 161 and 162 are at a right angle to each other, hence allowing the magnetizing direction 202 of the free layer 162 to be (magnetically) shifted in proportion to a magnitude of the leak magnetic field 190 from the disk and thus the spin-valve layer 160 to be varied in the resistance value corresponding to an angle of the shift (for example, a degree defined between the direction 202 and a direction 200).

The antiferromagnetic layer 164 which is a primary member in the spin-valve layer 160 is omitted in FIG. 19. FIG. 19 also shows H-R characteristic in a parallel magnetizing state (HEAD-B) and an antiparallel magnetizing state (HEAD-C) for comparison with the favorable state HEAD-A.

As described, it is essential in the read head (a GMR head) of the HDD that the pinning layer 161 of the spin-valve layer 160 has its magnetizing direction determined vertically to the disk. Meanwhile, the magnetizing direction of the pinning layer 161 is controlled and maintained by an exchange magnetic field on the antiferromagnetic layer 164. The magnitude (or intensity) of the exchange magnetic field is decreased with temperature and becomes zero when the temperature is a predetermined degree which is known as a blocking temperature. The blocking temperature of the antiferromagnetic layer made generally of an (Fe—Mn) alloy of iron and manganese is 150° C. When the ambient temperature about the spin-valve layer 160° C. exceeds 150° C., the magnetizing direction of the pinning layer 161 is shifted.

Also, it is proved in a process of manufacturing a GMR head, a process of assembling the GMR head in an HDD, or an action of the HDD having the GMR head that the magnetizing direction of the pinning layer 161 in the spin-valve layer 160 is likely to shift due to any combination of the following four factors (1) to (4).

(1) Ambient temperature

As described, when the GMR head is operated at a temperature exceeding the blocking temperature or the ambient temperature about the spin-valve layer 160 after determining magnetizing direction, exceeds the blocking temperature, the magnetizing direction of the pinning layer 161 may be shifted. With the GMR head assembled in an HDD, the temperature in the HDD is increased more or less to 20° C. due to heat generated by electric circuits and a motor. Generally, the temperature allowing a proper action of the HDD is about 60° C. The MR head (including GMR head) is fed with an operating current which is also called a sense current. Since the sense current generates heat, the temperature in the HDD is increased up to 40° C. Depending on extra conditions, the ambient temperature about the spin-valve layer 160 in the HDD may rise close to 120° C.

(2) Magnetic field from external source

Even if the ambient temperature is below the blocking temperature with the GMR head under its operable condition, development of an external magnetic field about the spin-valve layer 160 which is higher in the magnitude than the exchange magnetic field may shift the magnetizing direction of the pinning layer 161.

(3) ESD (electrostatic discharge)

When an instantaneous overcurrent is produced by an effect of ESD, it may break down the GMR element (the spin-valve layer 160). The overcurrent and decreases the amplitude of the exchange magnetic field, even if its rate is relatively small effects. The overcurrent generates heat and may introduce a magnetic field which is oriented opposite to the magnetizing direction of the pinning layer 161, due to the direction of the current. In other words, the effect of ESD stimulates the above two factors (1) and (2) at once. A specific degree of ESD may cause shifting of the magnetizing direction of the pinning layer 161. (4) Combination of the factors (1) to (3).

When the magnetizing direction of the pinning layer 161 is shifted from its correct orientation by an adverse effect of any combination of the three factors (1) to (3), the magnetic rotation on the free layer 162 triggered by the leak magnetic field from the disk may exhibit a different action from that based on a change in the resistance. This permits the read head to malfunction.

For compensation, it may be possible to provide an improved antiferromagnetic layer having a proper blocking temperature response and control the temperature in a process of manufacturing an MR head to a desired degree. However, either the effect of external magnetic fields depicted in the paragraph (2) or the effect of ESD depicted in the paragraph (3) is hardly controlled and will thus lead to the malfunction of the read head. It is also quite difficult to identify all the drawbacks and discriminate defective heads during the step of inspection before assembling the read/write head to the HDD. The exchange magnetic field declines due to the effect of ESD. Also, the read heads may be declined in the performance after operating a predetermined time, by temperature rise and time during HDD operating. If any of such troubles occurs after the GMR head is assembled as the read head in the HDD, it will prevent the user to read data from the disk in the HDD.

BRIEF SUMMARY OF THE INVENTION

It is an object of the present invention to provide a read head which incorporates a GMR read head including a spin-valve layer structure which, when its magnetizing direction is shifted by any incident from its planned direction, can activate a means for aligning the magnetizing direction with the planned direction.

For achievement of the above object, a head device according to the present invention has a spin-valve magnetoresistive (MR) element, the head device comprises: a pinning magnetic layer of which magnetizing direction is determined; a free magnetic layer of which magnetizing direction can be shifted by a signal magnetic field of an external source; and a nonmagnetic layer sandwiched between the pinning magnetic layer and the free magnetic layer, wherein the head device comprises a control element provided in proximity of the spin-valve MR element for correcting the magnetizing direction of the pinning magnetic layer.

Accordingly, if the magnetization in the pinning magnetic layer is interfered and its magnetizing direction is shifted from its planned direction, the control element generates a magnetic field to correct the magnetizing direction to its planned direction. When the read head is malfunctioned due to a shift of the magnetizing direction of the spin-valve layer, its read action can be recovered without difficulty by any incidents.

The control element may be a conductive film (or layer) which can produce a magnetic field upon receiving a corresponding current. The magnetic field produced by the control element remagnetizes the pinning magnetic layer for aligning the magnetizing direction with its planned or initial direction to recover the correct magnetic polarization.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinbefore.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 16 is a schematic view showing an structure of a conventional spin-valve layer structure;

FIGS. 17A and 17B are explanatory views showing an operational principle of the conventional spin-valve layer structure shown in FIG. 16;

FIG. 18 is a view of a structure of a conventional read/write head employing a GMR head of the spin-valve layer shown in FIG. 16.

DETAILED DESCRIPTION OF THE INVENTION

Figure 1:
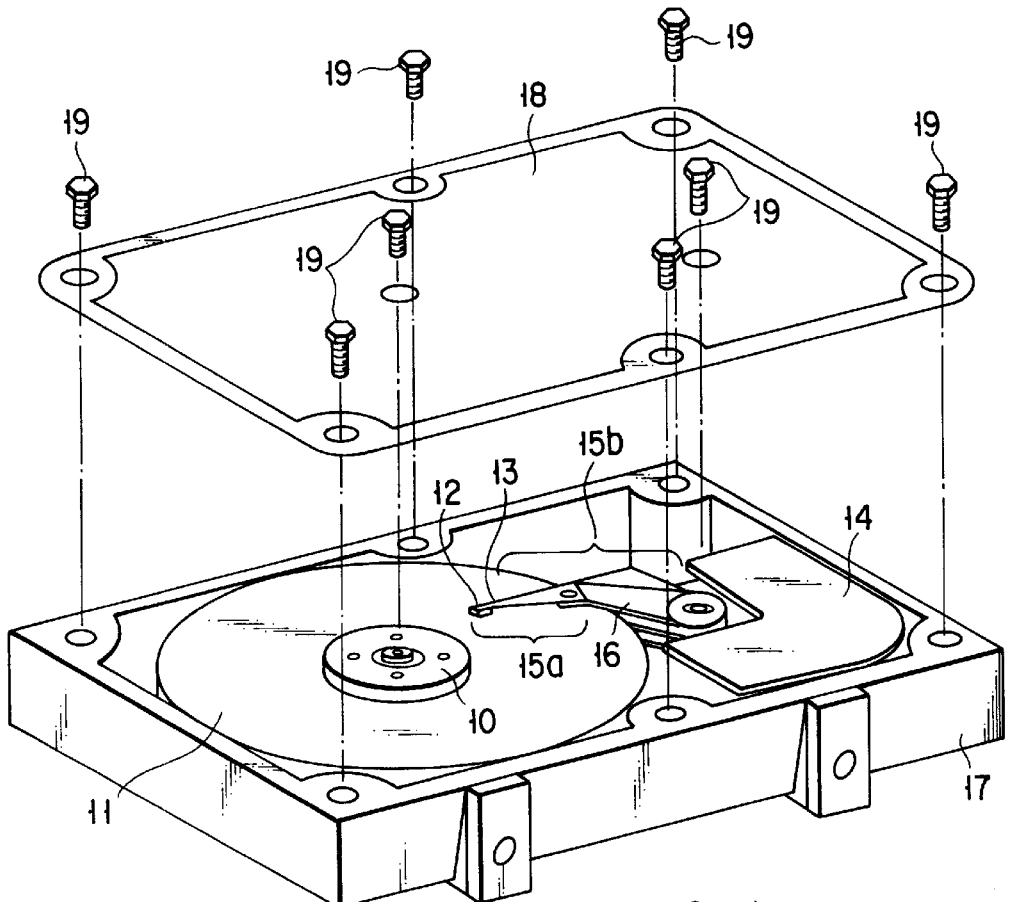
FIG. 1 is a perspective view of an HDD including a head device provided with a spin-valve MR head according to one embodiment of the present invention.

An embodiment of the present invention will be described referring to the accompanying drawings.

(Construction of HDD)

It is assumed that a spin-valve MR head (a GMR read head) of the embodiment is used as a read head of a read/write head 12 in an HDD device.

In the HDD, one or more disks (magnetic storage mediums) 11 are mounted on a spindle motor 10. The head 12 is supported by a suspension 13 so that it faces a corresponding one of the disks 11. In an operating mode of the HDD, the head 12 is floated over the disk 11 to read and write a data on the disk surface. More specifically, the head 12 is mounted by the suspension 13 to a carriage 16 which is driven by a voice coil motor 14 for rotation. The carriage 16 drives the head 12 to move to a target location (a track to be accessed) on the disk 11. A combination of the head 12 and the suspension 13 is called a head assembly 15a. A group of the head assemblies 15a in a stack is joined to the carriage 16, hence constituting a head stack assembly 15b.

The above components all are accommodated in a base 17. The top of the base 17 is covered with a top cover 18 joined by screws 19 thereto. Accordingly, the HDD constructed as described above has an airtight structure for preventing entering of dust from outside.

(Construction of spin-valve MR head)

Figure 2A:
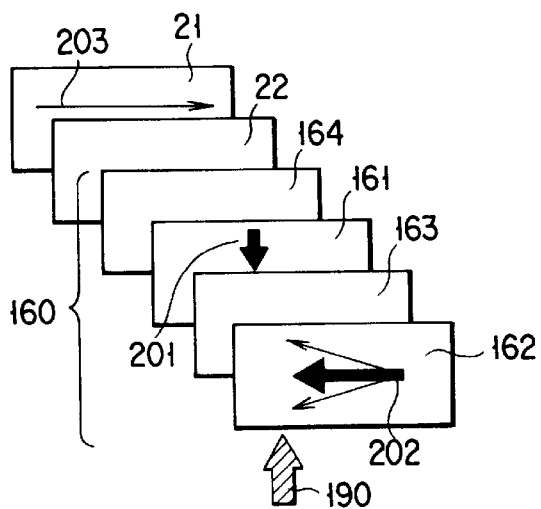
FIGS. 2A and 2B are explanatory views showing a theoretical arrangement and an operating principle of the spin-valve MR head.

FIG. 2A is a schematic view showing a spin-valve layer structure which is a main element of the GMR read head of the head 12 in the HDD according to the present invention, and its peripherals.

The spin-valve layer 160 of the embodiment comprises substantially a pinning layer (the magnetization determining layer) 161, a free layer (the soft magnetic layer) 162, a non-magnetic layer (the conductive layer) 163 sandwiched between the two layers 161 and 162, and an antiferromagnetic layer 164 forming a four-layer construction (See FIG. 16).

The GMR head 12 in the embodiment consists mainly of the spin-valve layer 160 and a remagnetization layer 21 (referred to as an RM layer hereinafter) which serves as a peripheral element, as shown in FIG. 2A. The RM layer 21 extends in parallel with the spin-valve layer 160 and acts as a control element for controlling the magnetizing direction of the pinning layer 161 through remagnetizing action. The RM layer 21 is a conductive layer made of titanium (Ti), chromium (Cr), or copper (Cu) and provided via an insulating layer 22 on the antiferromagnetic layer 164. The insulating layer 22 prevents shortcircuit between the antiferromagnetic layer 164 and the RM layer 21.

Figure 3:
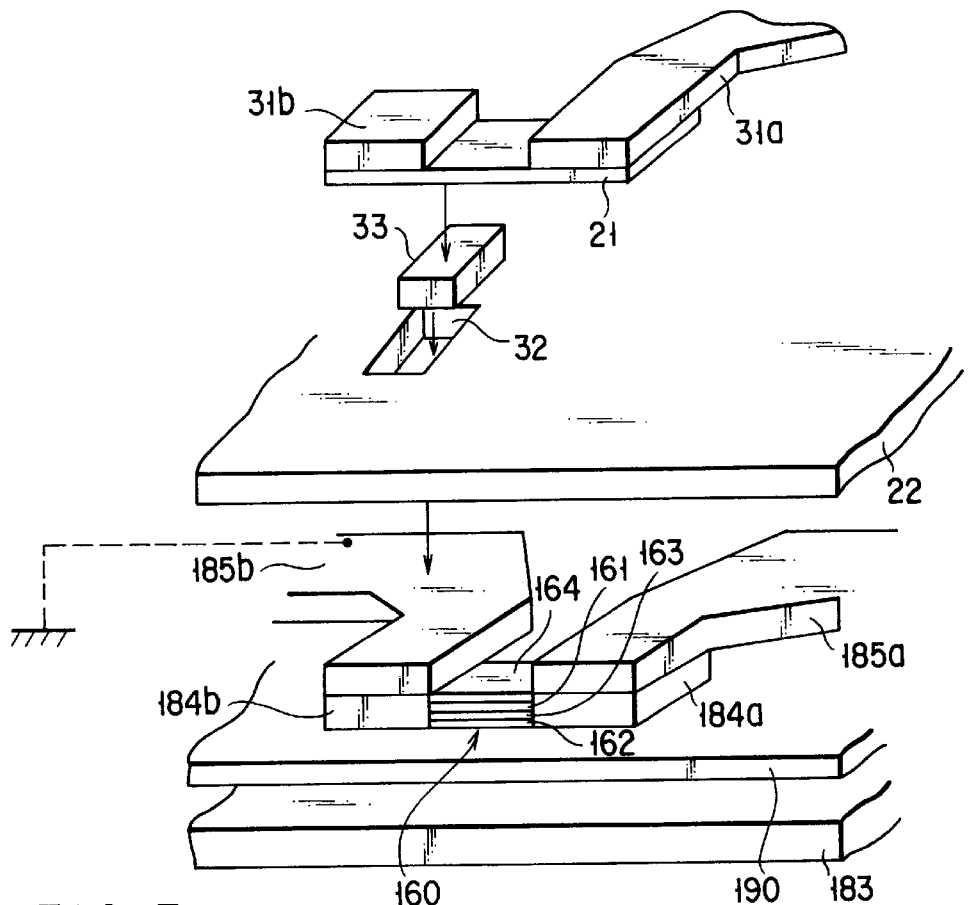
FIG. 3 is a view of a practical structure of the spin-valve MR head for use as a read head.

FIG. 3 illustrates a construction of the read head using the spin-valve MR head of the embodiment, in which like components are denoted by like numerals as those of the read head shown in FIG. 18. It is noted that the upper side in the following description means the antiferromagnetic layer 164 side of the spin-valve layer 160 and the lower side means the free layer 162 side of the same.

The read head in the embodiment includes an insulating layer 190 (of aluminum oxide, $Al_2O_3$) provided on a lower shield member 183 made of an alloy (Ni—Fe) of nickel and iron, as shown in FIG. 3. The spin-valve layer 160 comprising the four layers 161 to 164 is provided directly on the insulating layer 190. A couple of permanent magnets (or hard magnets) 184a and 184b are mounted to both sides of the spin-valve layer 160.

The spin-valve layer 160 is connected by the permanent magnets 184a and 184b to two leads 185a and 185b respectively. The arrangement explained by now is identical to that of the conventional read head shown in FIG. 18.

As a feature of the embodiment, the RM layer 21 is mounted via the insulating layer 22 (of aluminum oxide, $Al_2O_3$) over the spin-valve layer 160 and the two leads 185a and 185b. A couple of leads 31a and 31b are connected to both sides of the RM layer 21 respectively for feeding a supply current from outside. The leads 31a and 31b are conductive members for feeding the current to produce a magnetic field across the RM layer 21. The magnetic field of the RM layer 21 causes the magnetization of the pinning layer 161 in the spin-valve layer 160 to align with a predetermined direction (the planned magnetizing direction). The current is introduced to the lead 31a and flows out from the lead 31b.

In the construction shown in FIG. 3, there are spaces between the lower shield member 183 and the insulating layer 190, between the two leads 185a and 185b and the insulating layer 22, and between the insulating layer 22 and the remagnetization layer 21 for ease of understanding. Actually, they are assembled directly without the spaces.

The insulating layer 22 has a through hole 32 provided therein for communicating a portion of the RM layer 21 at the lead 31b with the lead 185b. More particularly, a contact 33 made of titanium (Ti) is provided in the through hole 32 for electrically connecting the lead 31b on the RM 21 via the contact 33 to the lead 185b. In the embodiment, the lead 185b, not the lead 31b, extends like the leads 185a and 31a, via a signal line, to a head amplifier circuit 52 which will be described later. The lead 31b is not connected to the signal line. The lead 185b is grounded at the other end.

(Operation of RM layer 21)

In the read head, the magnetizing direction of the pinning layer 161 in the spin-valve layer 160 is aligned by the action of the antiferromagnetic layer with the planned direction (denoted by 201 in FIGS. 2A and 2B) as in its initial state during the head manufacturing process. However, when the read head of the head 12 has been built in the HDD, the magnetizing direction 201 of the pinning layer 161 may be shifted or the magnetization may be weakened due to the adverse effect of the prescribed factors.

The present invention allows the RM layer 21 to act as a control element for maintaining the magnetizing direction 201 of the pinning layer 161 by producing the magnetic field. The magnetic field produced by the RM layer 21 is used for aligning the magnetizing direction 201 or remagnetizing the pinning layer 161.

Figure 2B:
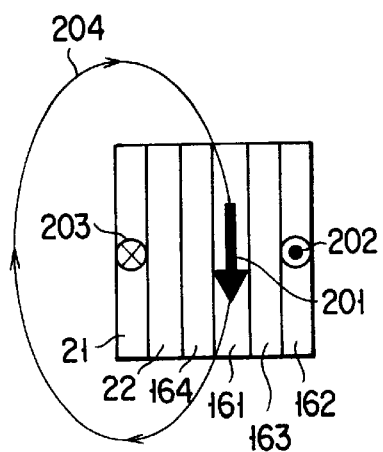

More specifically, a proper (remagnetizing) current 203 is applied to the RM layer 21 which thus produces the magnetic field as shown in FIG. 2A. When the current 203 runs vertical to the sheet of paper or from the upper side of the paper to the lower side as shown in FIG. 2B, it develops a magnetic field 204 across the pinning layer 161 (and the antiferromagnetic layer 164). The magnetic field 204 causes the magnetizing direction 201 of the pinning layer 161 to align with the initial (or planned) direction. At the time, the RM layer 21 is isolated by the insulating layer 22 from the antiferromagnetic layer 164 and will hardly be affected by any signal magnetic field produced in the common read action on a disk.

(Modification of the construction of spin-valve MR head)

Figure 4A:
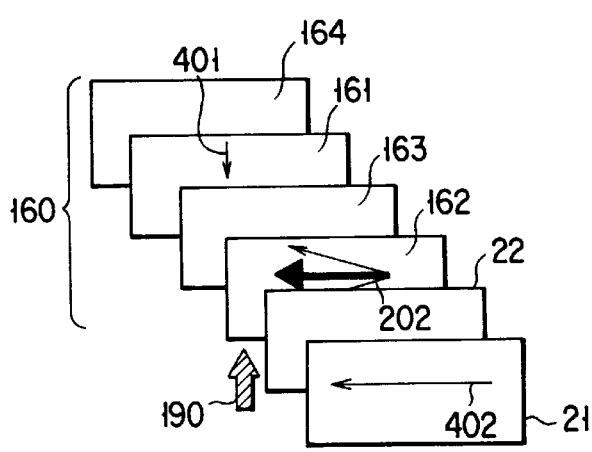
FIGS. 4A and 4B are views showing a modification of the spin-valve MR head.
Figure 4B:
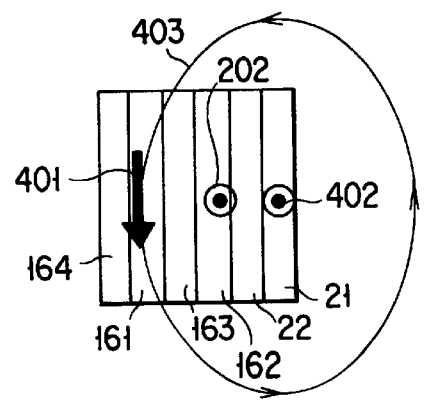

It is designed that the RM layer 21 is provided on the antiferromagnetic layer 164 side of the spin-valve layer 160 in the embodiment. FIGS. 4A and 4B show. a modification of the embodiment in which the RM layer 21 is mounted via the insulating layer 22 to the free layer 162. In that case, the insulating layer 22 prevents shortcircuit between the free layer 162 and the RM layer 21.

The modification is opposite to the construction of the embodiment (shown in FIG. 2A), having the RM layer 21 and the insulating layer 22 located in an inverse relationship. In the modification, the magnetizing direction 401 of the pinning layer 161 can be corrected to its initial state by the same principle of control.

In the initial state during the head manufacturing process, the magnetizing direction 401 of the pinning layer 161 is aligned by the action of the antiferromagnetic layer 164 with the planned direction. When the read head of the head 12 has been built in the HDD, the magnetizing direction 401 of the pinning layer 161 may be shifted or the magnetization may be weakened due to the adverse effect of the prescribed factors.

The modification allows the RM layer 21 to be fed with a proper (remagnetizing) current 402 and thus produce a magnetic field as shown in FIG. 4A. When the current 402 runs vertical to the sheet of paper or from the lower side of the paper to the upper side as shown in FIG. 4B, it produces the magnetic field 403 across the pinning layer 161 (and the antiferromagnetic layer 164). The magnetic field 403 causes the magnetizing direction 401 of the pinning layer 161 to align with the initial (or planned) direction.

The foregoing action where the RM layer 21 is fed with a current for aligning the magnetizing direction of the pinning layer 161 may be performed with the head 12 supported by the suspension 13 or on the head assembly 15a. Also, the action can be carried out with a group of the head assemblies 15a mounted in a stack on the carriage 16 or on the head stack assembly 15b. Moreover, the action may successfully be conducted with the help of the head amplifier circuit described below after the head 12 is built in the HDD, without dismounting the head 12.

(Construction of head amplifier circuit)

Figure 5:
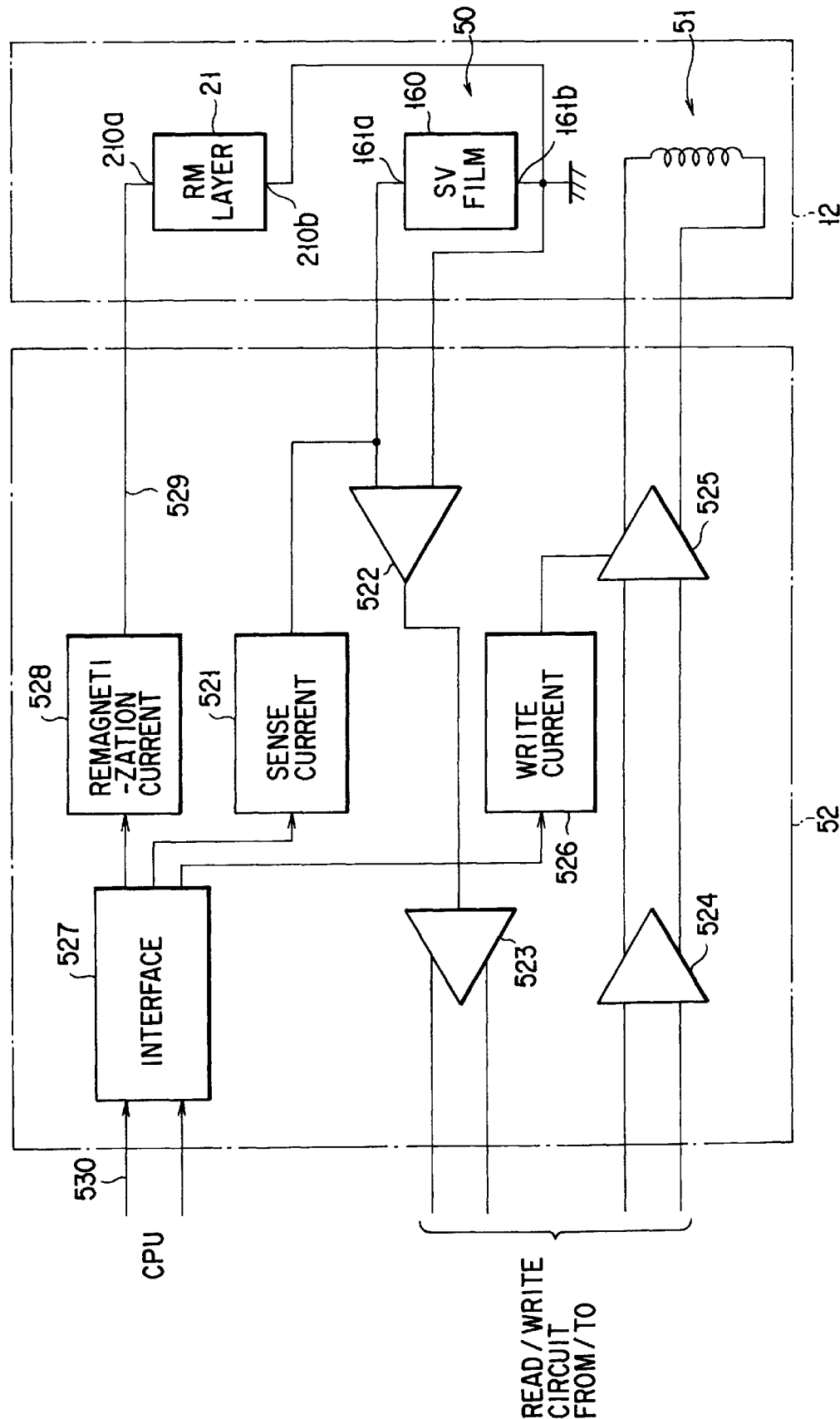
FIG. 5 is a block diagram of a head amplifier circuit for activating the spin-valve MR head shown in FIGS. 2A and 4A.

FIG. 5 is a block diagram of a construction of the head amplifier circuit for activating the head 12 including the spin-valve MR (read) head of the present invention assembled in the HDD.

As described previously, the head 12 comprises the read head (a spin-valve MR head) including the spin-valve layer 160 and the RM layer 21 and a write head 51 (identical to the write head 181 shown in FIG. 18). The RM layer 21 is a control element for aligning the magnetizing direction of the pinning layer 161. The spin-valve layer 160 includes a pair of leads 161a and 161b (identical to the leads 185a and 185b respectively shown in FIG. 3). The lead 161b is grounded. This is necessary because the lead circuit of the embodiment is of a single end type similar to the lead circuit for a common MR head. The RM layer 21 includes a couple of leads 210a and 210b (identical to the leads 31a and 31b respectively shown in FIG. 3).

The head amplifier circuit 52 comprises a sense current control circuit 521 for feeding a sense current to the spin-valve layer 160, a read amplifier 522 for amplifying a signal (of a voltage between the two leads 161a and 161b corresponding to a change in the resistance of the spin-valve layer 160) detected by the spin-valve layer from a lead magnetic field of the disk 11, and a read buffer amplifier (a differential amplifier) 523 for converting a signal output of the read amplifier 522 to its differential form which is then released as the data signal.

The head amplifier circuit 52 further comprises a write predriver 524 for amplifying a write data signal, a write driver 525 responsive to an output of the write predriver 524 for feeding the write head 51 with a write current, a write current control circuit 526 for controlling the write current supplied from the write driver 525 to the write head 51, and a serial interface 527 for communicating with a CPU or the main control device in the HDD for exchanging of data.

The above components in the head amplifier circuit 52 are similar to those of a conventional head amplifier circuit for a read/write head using a known MR head. The head amplifier circuit 52 of the embodiment is distinguished from the conventional circuit by the fact that a remagnetizing current control circuit 528 is provided for feeding the RM layer 21 with a current (identical to the current 203 shown in FIG. 2A or and 402 shown in FIG. 4A), in addition to the above components. In general, two signal lines 529 are needed for feeding the current from the remagnetizing current control circuit 528 to the RM layer 21. The single end type circuit allows one of the two leads 210a and 210b of the RM layer 21 or more specifically an output side 210b to be connected to the ground. It is apparent that when the GND side lead 210b of the RM layer 21 and the GND side lead 161b of the spin-valve layer 160 are connected to each other in the head 12, one of the signal lines 529 between the remagnetizing current control circuit 528 and the RM layer 21 is eliminated. The head amplifier circuit 52 of the embodiment may be implemented in an IC (integrated circuit) form.

The remagnetizing current control circuit 528, like the sense current control circuit 521 and the write current control circuit 526, is connected to the serial interface 527. This permits the CPU to give amplifier control signals 530 via the serial interface 527 to the remagnetizing current control circuit 528 as well as the sense current control circuit 521 and the write current control circuit 526. In response to the control signal from the CPU, the remagnetizing current control circuit 528 supplies a current via the signal line 529 to the RM layer 21 in the head 12. The current (identical to the current 203 shown in FIG. 2A or 402 shown in FIG. 4A) causes the RM layer 21 to produce a magnetic field. As described previously, the magnetic field on the RM layer 21 can align the magnetizing direction of the pinning layer 161 with the initial (or planned) direction.

The circuit shown in FIG. 5 is adapted for operating with the single head 12. If N heads 12 (N being an integer of 2 or higher) are provided, N of the signal lines 529 are needed for feeding the current from the remagnetizing current control circuit 528 to the RM layer 21. In that case, the remagnetizing current control circuit 528 does not need to be increased in number regardless of the number of the heads 12 but is equipped with a selector circuit for selecting (or switching) N of the RM layers to be supplied with the current. The other components in the head amplifier circuit 52 (including the sense current control circuit 521 and the write current control circuit 526) are also modified in the same manner.

(Read error processing)

Figure 6:
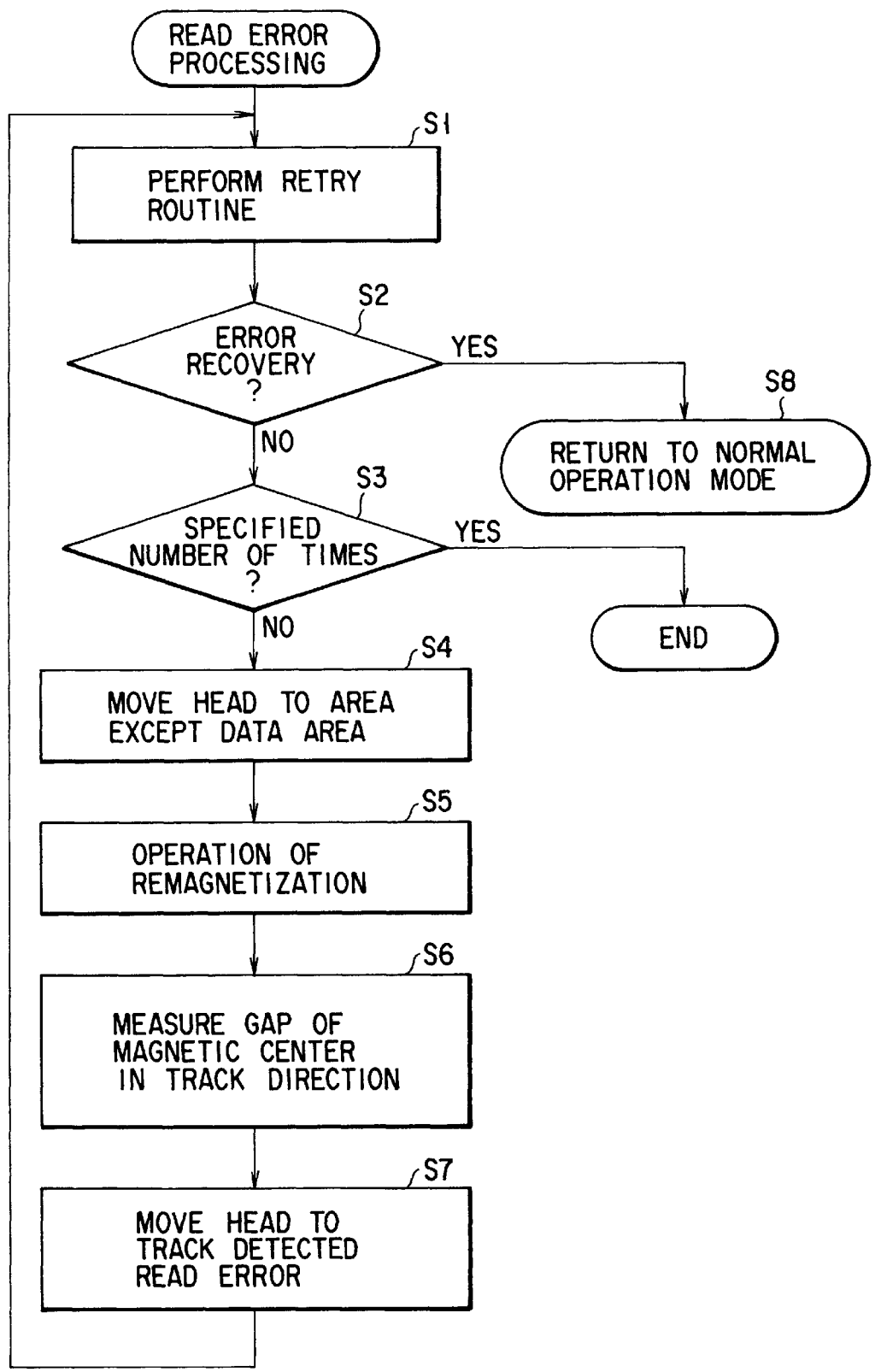
FIG. 6 is a flowchart showing a procedure of read error processing with the spin-valve MR head.

The timing for feeding the current via the head amplifier circuit 52 to the RM layer 21 is explained with two different cases. In the first case, the feeding is executed during the read error process. In the second case, the current is supplied at a predetermined moment or intervals of time in the action of the HDD. The predetermined moment may be, for example, the start up of the HDD. The predetermined intervals may be, for example, of 500 hours of service or of a desired energizing period in the HDD. Some types of the HDD proposed recently are provided in which the energizing period is considered as an error indicative parameter and used for predicting an error. Also, the feeding can be conducted during the read error process where an error is detected and corrected in the reading of data from the disk of the HDD. The read error processing will be explained in more detail referring to the flowchart of FIG. 6.

Upon a read error occurring, the CPU starts a common retry routine to repeat the reading action (Step S1). In the retry routine, it is checked whether the read error is eliminated or not (Step S2). The retry routine is a procedure of repeating the reading action up to a maximum number of times until the error is eliminated. When the read error is eliminated, the CPU directs the procedure to return back to a normal operation mode (for read/write action) (Step S8).

If the read error is not eliminated or the retry routine is finished with failure, the CPU checks whether or not the retry routine has been repeated the maximum number of times (Step S3). When the retry routine has not been repeated the maximum number of times, the CPU drives the voice coil motor 14 to move out the head 12 to an other region (e.g. a CSS area at the outermost edge) than the data area on the disk 11 (Step S4). This is followed by the CPU directing the remagnetizing current control circuit 528 in the head amplifier circuit 52 to feed the RM layer 21 of the head 12 with the current for remagnetizing the pinning layer 161 (Step S5). Accordingly as described previously, the magnetizing direction of the pinning layer 161 is aligned with the initial direction. As the head 12 has been moved out from the data area, data saved in the data area of the disk 11 are prevented from being affected by the magnetic field produced by the RM layer 21 fed with the current.

It is likely that the read heads (of GMR element) and the write heads are found not identical to each other in the center location relative to a track in the manufacturing process of thin film forming technology. In particular, the difference may result from fault alignment of masks used in the thin film technology head manufacturing process. Also, the read head and the write head may be different from each other in the magnetic center due to non-uniformity in the profile of magnetization in the GMR element in addition to the prescribed optical alignment error. For compensation, a positional difference between the heads is measured in the head manufacturing process before shipment of the HDD and recorded in a non-volatile memory (an EEPROM) in the HDD. In the read/write action of the HDD, the positional difference is read from the nonvolatile memory and used for determining the correct position of the head 12.

This is also associated with the embodiment in which the profile of magnetization in the spin-valve layer 160 may be biased when the RM layer 21 is fed with the current. As the read hear 50 and the write head 51 are different in the magnetic center from each other, the head 12 will hardly be located to its correct position. According to the embodiment, the CPU moves the head 12 to a reference track on the disk 11 when the RM layer 21 has been energized and measures displacements of the magnetic center of both the read head 50 and the write head 51 from the reference track (Step S6). In other words, the CPU updates the measurement of dislocation recorded in the non-volatile memory. Using the updated measurements, the CPU controls and determines the correct position of the head 12.

Then, the CPU moves the head 12 back to the track where the read error occurs and repeats the retry routine (Step S7). If the read error results from a shift of the magnetizing direction of the pinning layer 161 from its planned direction or a decrease in the magnetization, the retry routine is successfully performed at higher provability hence eliminating the read error.

(Process of manufacturing spin-valve MR head)

The process of manufacturing the spin-valve layer 160 and its peripheral elements shown in FIG. 3 will now be described referring to FIGS. 7A to 7D, 8A to 8D, 9A to 9D, and 10A and 10B.

Figure 7A:
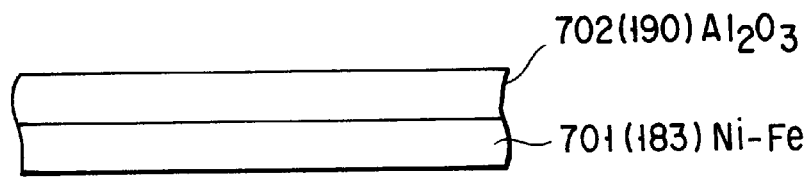
FIGS. 7A to 7D, 8A to 8D, 9A to 9D, and 10A and 10B are explanatory views showing steps of manufacturing the spin-valve MR head.

The process starts with forming a highly permeable soft magnetic layer 701 of 1 to 4 μm thick made from a nickel-iron alloy (Ni—Fe) on a substrate (not shown) made from AlTiC and then an insulating layer 702 of 30 to 200 nm thick made of alumina ($Al_2O_3$) on the layer 701 using a sputtering method (FIG. 7A). The highly permeable soft magnetic layer 701 and the insulating layer 702 serve as the lower shield member 183 and the insulating layer 190 shown in FIG. 3.

Figure 7B:
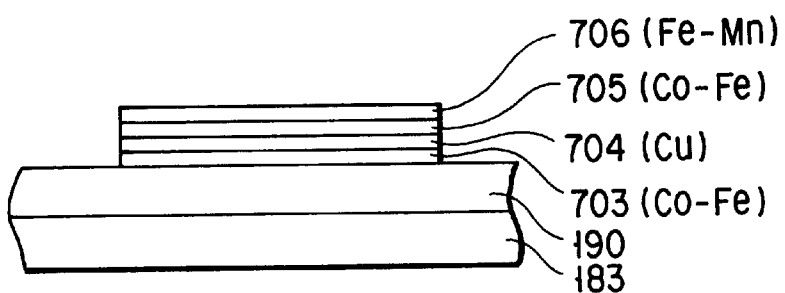
Figure 7C:
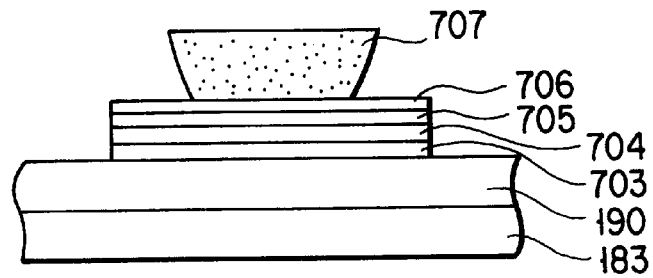

Also, using the sputtering method, formed are a magnetic layer 703 of 2 to 10 nm thick made from a cobalt-iron alloy (Co—Fe), a non-magnetic layer 704 of 2 to 10 nm made from copper (Cu), a magnetic layer 705 of 2 to 10 nm thick made from Co—Fe, and an antiferromagnetic layer 706 of 2 to 10 nm made from an iron-manganese alloy (Fe—Mn) (FIG. 7B). The antiferromagnetic layer 706 may be made from an iridium-manganese alloy. The above layers are provided in a wide extension than that of the spin-valve layer 160. This step may be performed by masking the non layer region and sputtering the four layers 703 and 706 in a succession before removing the masking. The four layers 704 to 706 act as the free layer 162, the non-magnetic layer 163, the pinning layer 161, and the antiferromagnetic layer 164 of the spin-valve layer 160 respectively.

Figure 7D:
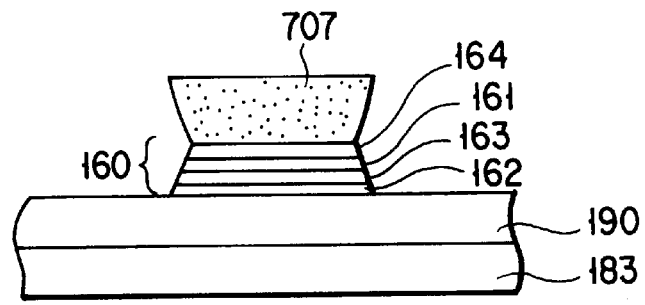

The extension of the spin-valve layer 160 is then covered with a mask 707 (FIG. 7C) and portions of the four layers 703 to 706 off the mask 707 are removed off (FIG. 7D). The removal step may be carried out by a known ion milling method with argon ions. As the result, the spin-valve layer 160 comprising the free layer 162, the non-magnetic layer 163, the pinning layer 161, and the antiferromagnetic layer 164 is completed. It is noted that the sides of the mask 707 are tilted with the bottom narrowed so that the spin-valve layer 160 formed by the ion milling method has tilted sides. The tilted sides of the spin-valve layer 160 provide higher electrical contact with the permanent magnets 184a and 184b.

Figure 8A:
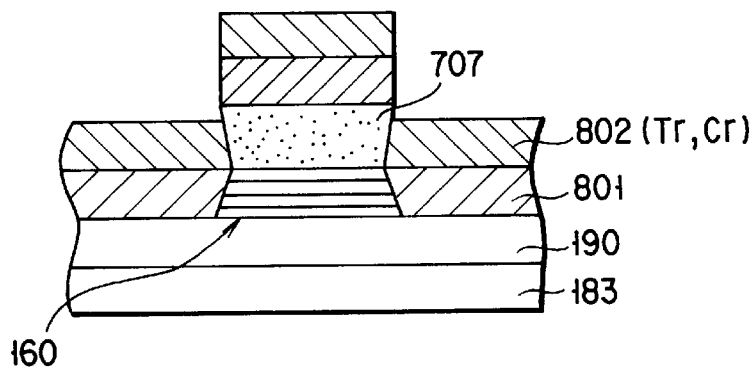
Figure 8B:
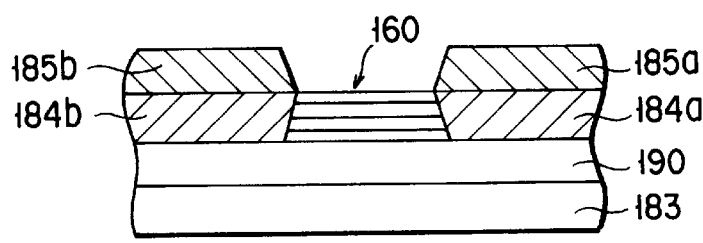
Figure 8C:
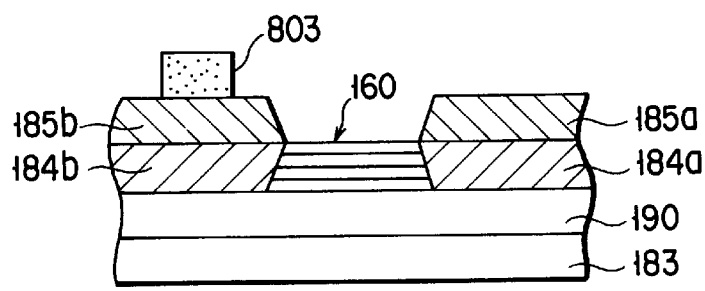
Figure 8D:
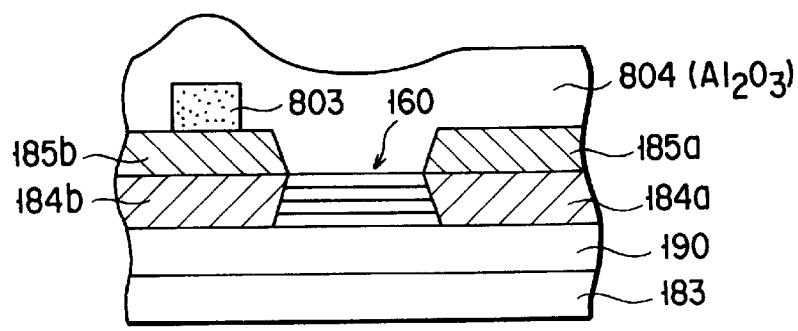

Next, with the mask 707 remaining intact, formed by the sputtering method are a hard magnetic layer 801 of 8 to 40 nm thick made from a cobalt alloy (e.g. Co—Pt) which turns to the permanent magnets 184a and 184b, and a conductive layer 802 of 30 to 100 nm thick made from titanium (Ti) or chromium (Cr) which turns to the leads 185a and 185b (FIG. 8A). The mask 707 is then removed (FIG. 8B). There are now developed the permanent magnets 184a and 184b and the leads 185a and 185b on both sides the spin-valve layer 160. A mask 803 is provided to cover a region where the through hole 32 is located as shown in FIG. 3 (FIG. 8C) and an insulating layer 804 of alumina ($Al_2O_3$) is formed (FIG. 8D).

Figure 9A:
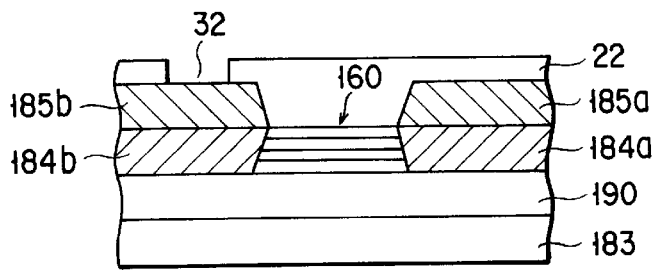

This is followed by lapping the surface of the layer 804 to expose the mask 803 and removing the mask 803 (FIG. 9A).

Figure 9B:
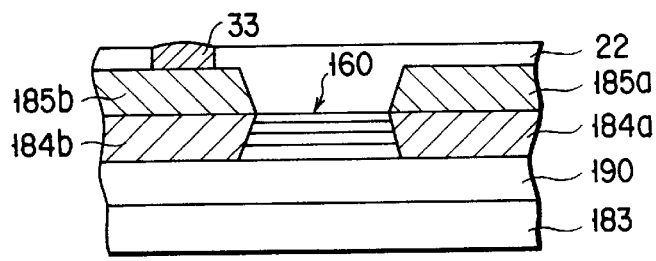
Figure 9C:
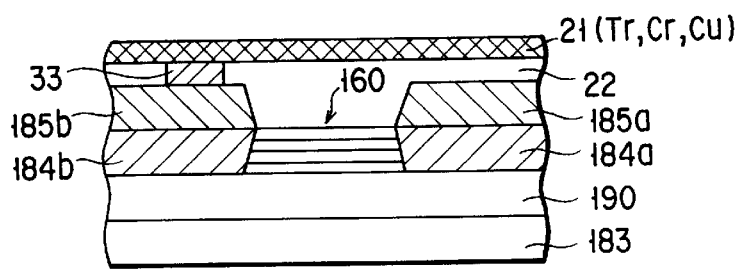

Accordingly, the layer 804 is turned to the insulating layer 22 of 30 to 50 nm thick with the through hole 32. The through hole 32 (where the lead 185b is exposed) is then filled with titanium (Ti) by plating to form the contact 33 (FIG. 9B). A further mask (not shown) is provided on a region other than the extension of the RM layer 21 and a conductive layer of Ti, Cr, or Cu material which turns to the RM layer 21 is formed by the sputtering. The surface of the layer 21 is lapped to expose the mask which is then removed off. As the result, the RM layer 21 is developed having a thickness of 10 to 50 nm (FIG. 9C).

Figure 9D:
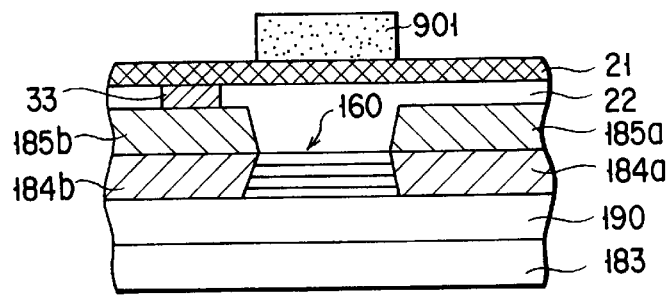
Figure 10A:
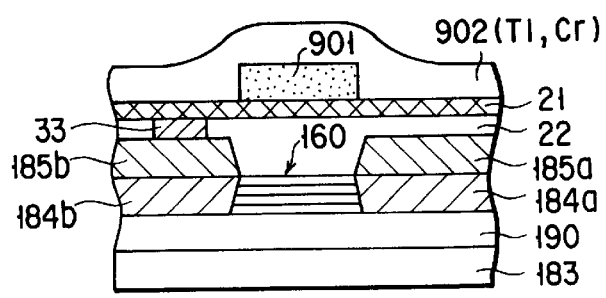
Figure 10B:
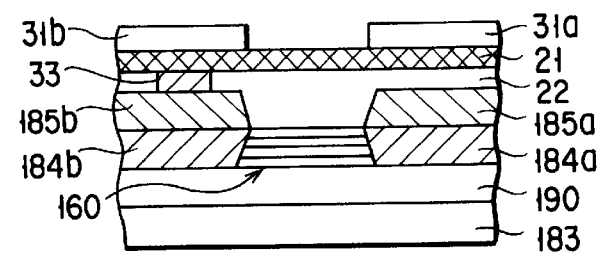

Again, a mask 901 is provided on a region other than the extension of the leads 31a and 31b on the RM layer 21 (FIG. 9D). A conductive layer 902 of Ti or Cr is formed by the sputtering which turns to the leads 31a and 31b (FIG. 10A). The surface of the layer 902 is lapped to expose the mask 901 and after the mask 901 is removed off, the leads 31a and 31b of 2 to 10 nm thick are developed (FIG. 10b).

In this manner, the spin-valve layer 160 and its peripheral elements in the spin-valve MR head shown in FIG. 3 are completed.

The process of manufacturing the spin-valve layer 160 and its peripheral elements shown in FIG. 4A for a modification of the spin-valve MR head will be described referring to FIGS. 11A to 11D, 12A to 12D, 13A to 13D, 14A to 14C, and 15A to 15C.

Figure 11A:
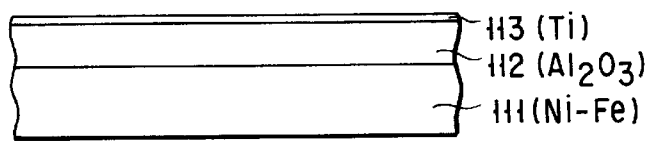
FIGS. 11A to 11D, 12A to 12D, 13A to 13D, 14A to 14C, and 15A to 15C are explanatory views showing steps of manufacturing a modification of the spin-valve MR head.

The process starts with forming a highly permeable soft magnetic layer Ill made of a nickel-iron alloy (Ni—Fe) on a substrate (not shown) made of AlTiC and then an insulating layer 112 made of alumina ($Al_2O_3$) and a seed layer 113 made of titanium (Ti) on the layer 111 using a sputtering method (FIG. 11A). The highly permeable soft magnetic layer 111 and the insulating layer 112 act as the lower shield member 183 and the insulating layer 190 shown in FIG. 3 and are 1 to 4 μm and 30 to 200 nm in the thickness respectively.

Figure 11B:
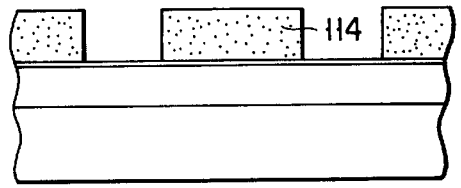
Figure 11C:
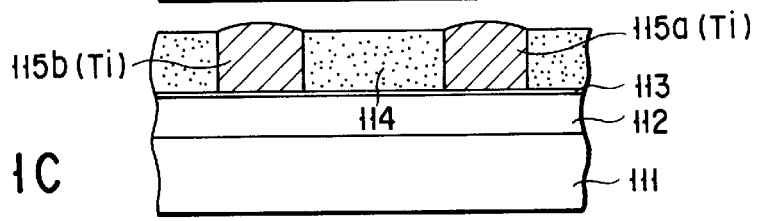
Figure 11D:
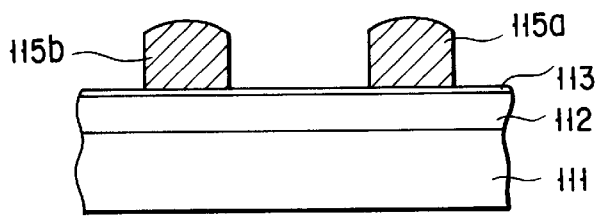

For forming the leads 31a and 31b shown in FIG. 3, a pattern of mask 114 is provided on regions other than the extension of the leads (FIG. 11B). A thickness, 2 to 10 nm, of titanium (Ti) is plated on regions where the seed layer 113 is exposed to form leads 115a and 115b which act as the leads 31a and 31b shown in FIG. 3 (FIG. 11C). Then, the pattern of mask 114 is removed off (FIG. 11D). It is noted that the lead 115a is a current input lead while the lead 115b is a current output (GND side) lead.

Figure 12A:
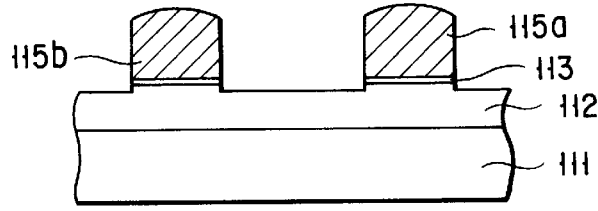
Figure 12B:
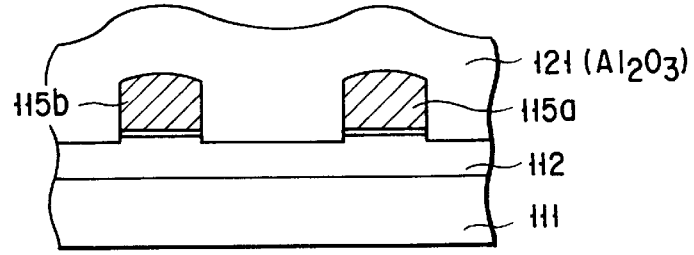
Figure 12C:
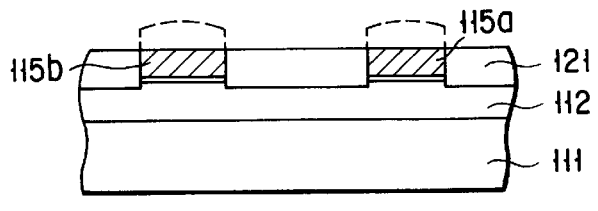
Figure 12D:
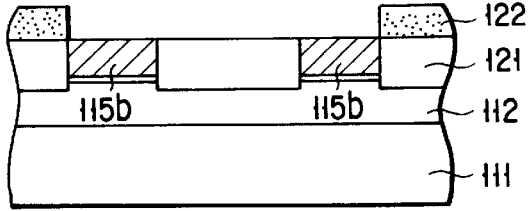

This is followed by removing the exposed or other regions of the seed layer 113 than beneath the leads 115a and 115b using the ion milling method (FIG. 12A). An insulating layer 121 made of alumina ($Al_2O_3$) is then provided (FIG. 12B). The surface of the layer 121 is lapped until the leads 115a and 115b are exposed (FIG. 12C). A mask 122 is provided on a region other than the extension of the RM layer 21 (FIG. 12D).

Figure 13A:
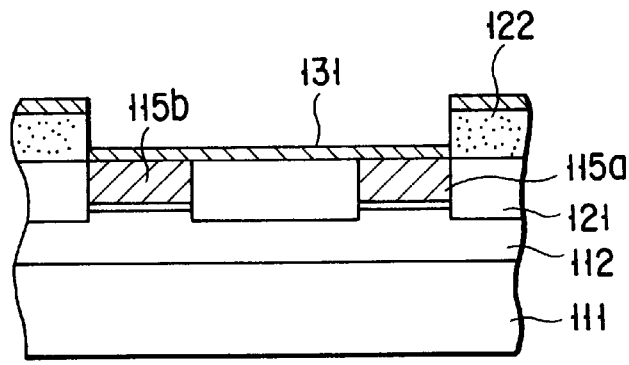
Figure 13B:
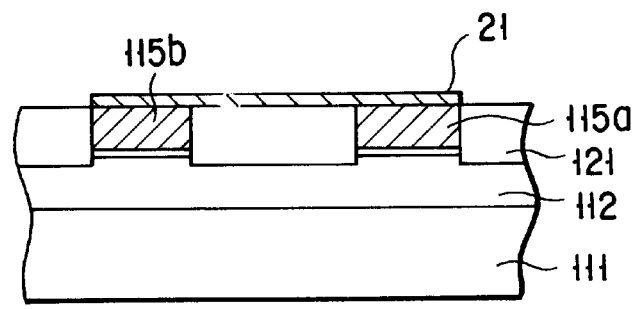
Figure 13C:
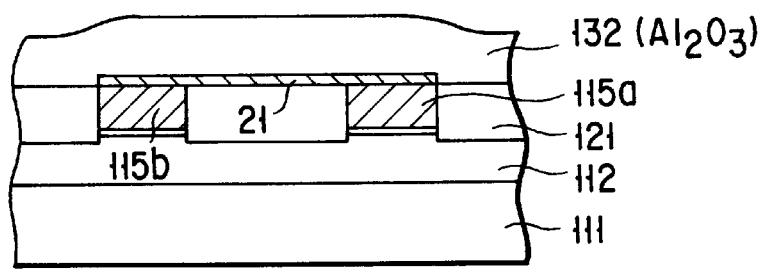
Figure 13D:
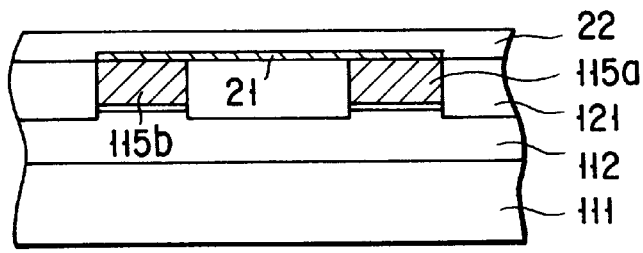

By the sputtering, A conductive layer 131 made of Ti, Cr, or Cu is formed which turns to the RM layer 21 (FIG. 13A). The mask 122 is then removed off. More particularly, while a portion of the conductive layer 131 on the mask 122 has been removed, the remaining portion of the conductive layer 131 turns to the RM layer 21 shown in FIG. 4A (FIG. 13B). An insulating layer 132 made of alumina ($Al_2O_3$) is formed (FIG. 13C). The surface of the insulating layer 132 is lapped until a thickness, 30 to 50 nm, of the insulating layer 22 is developed as shown in FIG. 4A (FIG. 13D).

Figure 14A:
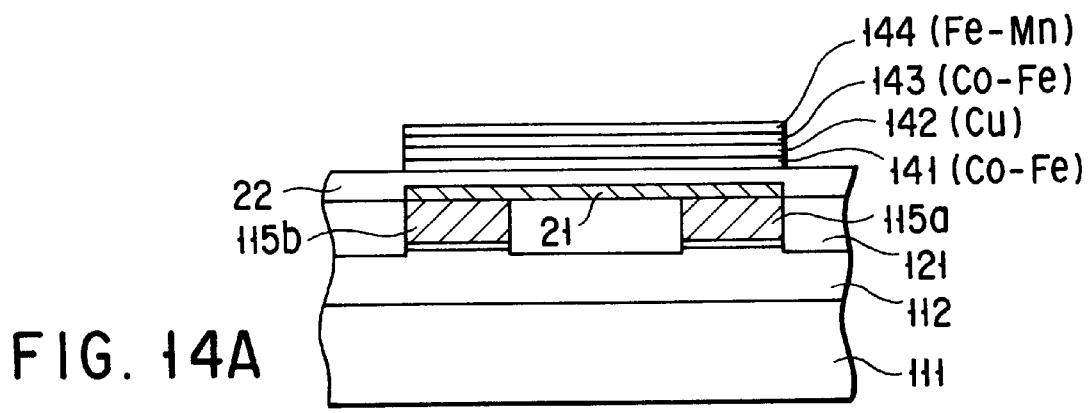

This is followed by sputtering a magnetic layer 141 made of a cobalt-iron alloy (Co—Fe), a non-magnetic layer 142 made of copper (Cu), a magnetic layer 143 made of Co—Fe, and an antiferromagnetic layer 144 made of an iron-manganese alloy (Fe—Mn) (FIG. 14A). The antiferromagnetic layer 144 may be formed of an iridium-manganese alloy. It is noted that the layers, each having a thickness of 2 to 10 nm, are provided in a wider extension than the size of the spin-valve layer 160. Those steps can be implemented by providing a pattern of mask on a region other than the target region and sputtering the four layer 141 to 144 in a succession before removing the mask. The four layers 141 to 144 are turned to the free layer 162, the nonmagnetic layer 163, the pinning layer 161, and the antiferromagnetic layer 164 respectively of the spin-valve layer 160.

Figure 14B:
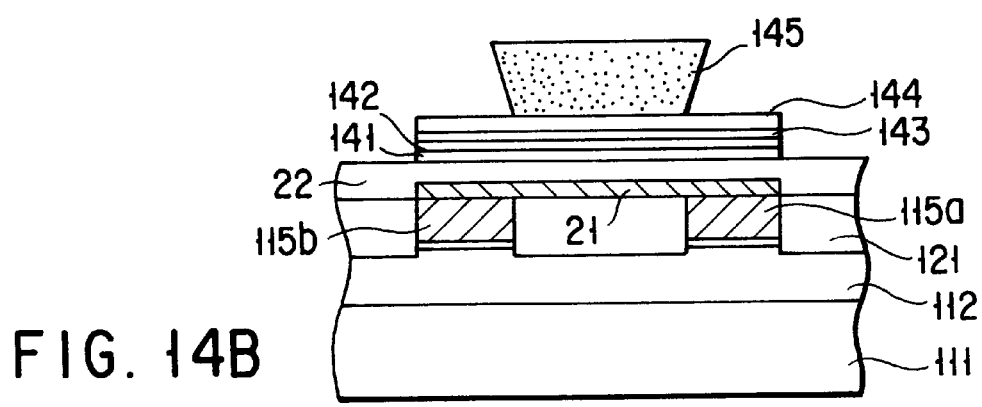
Figure 14C:
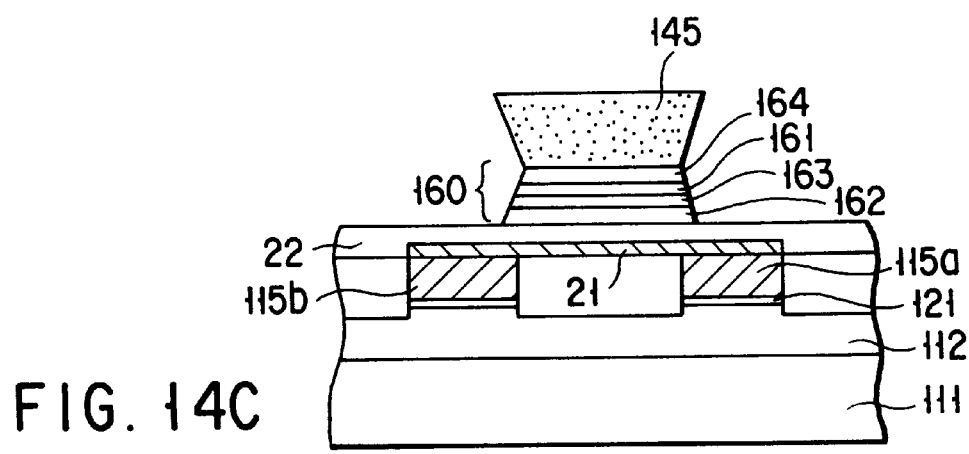

Then, a mask 145 is provided over the extension of the spin-valve layer 160 (FIG. 14B). When portions of the four layers 141 to 145 not covered with the mask 145 have been removed by the ion milling method, the spin-valve layer 160 comprising the free layer 162, the non-magnetic layer 163, the pinning layer 161, and the antiferromagnetic layer 164 is completed (FIG. 14C).

Figure 15A:
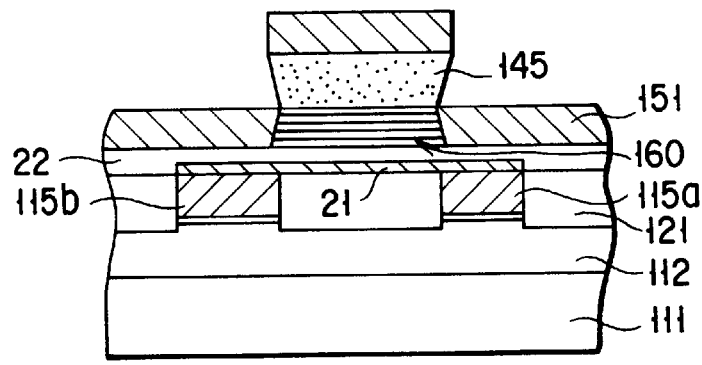
Figure 15B:
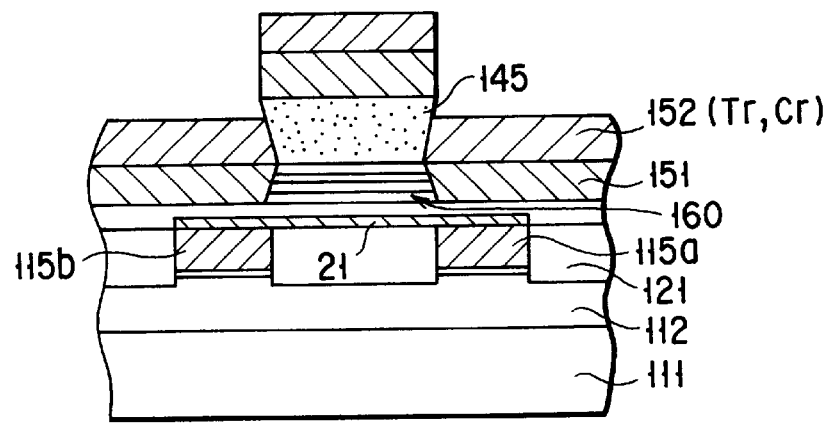
Figure 15C:
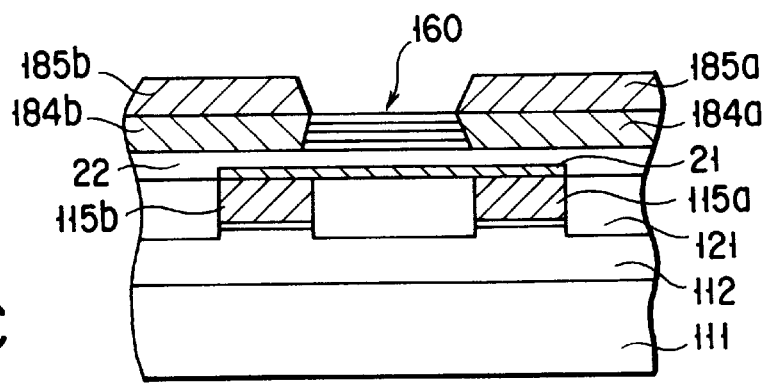
Figure 19:
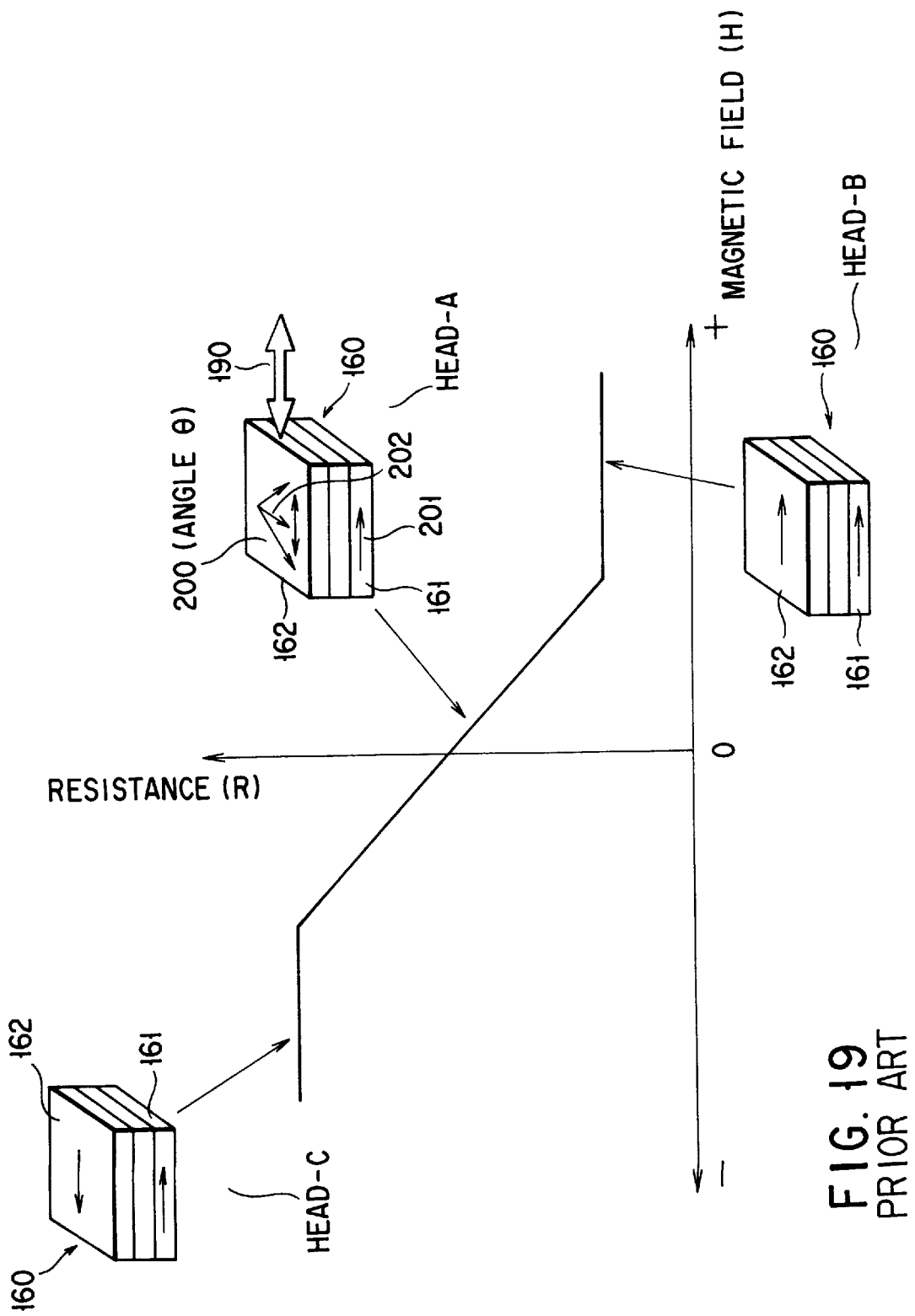
FIG. 19 is an explanatory view showing an operational principle of the head shown in FIG. 18.

Next, with the mask 145 remaining intact, formed by the sputtering method are a hard magnetic layer 151 of 8 to 40 nm thick made from a cobalt alloy (e.g. Co—Pt) which turns to the permanent magnets 184a and 184b (FIG. 15A). A conductive layer 152 made of Ti or Cr is sputtered to a thickness of 30 to 100 nm to form the leads 185a and 185b (FIG. 15B). When the mask 145 has been removed off, there are developed the permanent magnets 184a and 184b and the leads 185a and 185b on both sides the spin-valve layer 160 (FIG. 15C).

In this manner, the spin-valve layer 160 and its peripheral elements for the modification of the sing-valve MR head shown in FIG. 4A are completed. Although the lead 185b of the spin-valve layer 160 and the lead 115b of the RM layer 21 are not electrically connected to each other as shown in FIG. 15C, they may be connected in the same manner as shown in FIG. 3.

As set forth above, the present invention provides a novel construction of the read head in which the RM layer as a control element for aligning the magnetizing direction of the pinning layer is located adjacent to the spin-valve layer (a GMR element) in a spin-valve MR head. When the magnetizing direction of the pinning layer is shifted by any incident from its initial (or planned) direction, it can be corrected by the remagnetizing action of the novel construction of the read head. This permits the read head to be recovered after its GMR element is malfunctioned. As the read head of the present invention is used in an HDD apparatus, the operational reliability of the HDD will be improved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A head device having a spin-valve magnetoresistive (MR) element, the head device comprising:

a pinning magnetic layer whose magnetizing direction is determined;

a free magnetic layer whose magnetizing direction can be shifted by a signal magnetic field of an external source; and a non-magnetic layer sandwiched between the pinning magnetic layer and the free magnetic layer; and a control element provided in proximity to the spin-valve MR element and in parallel with the spin-valve MR element, and being made of a material which produces a magnetic field that controls the magnetizing state of the pinning magnetic layer.

2. The device according to claim 1, wherein the control element is a conductive layer.

3. A head device having a spin-valve magnetoresistive (MR) element, the head device comprising:

a pinning magnetic layer whose magnetizing direction is determined;

a free magnetic layer whose magnetizing direction can be shifted by a signal magnetic field of an external source; and a non-magnetic layer sandwiched between the pinning magnetic layer and the free magnetic layer, said head device further comprising:

a control element provided in proximity of the spin-valve MR element for correcting the magnetizing direction of the pinning magnetic layer;

wherein the spin-valve MR element includes an antiferromagnetic layer for determining the magnetizing direction of the pinning magnetic layer, and the control element is a conductive layer joined by an insulating layer to the antiferromagnetic layer.

4. A head device having a spin-valve magnetoresistive (MR) element, the head device comprising:

a pinning magnetic layer whose magnetizing direction is determined;

a free magnetic layer whose magnetizing direction can be shifted by a signal magnetic field of an external source; and a non-magnetic layer sandwiched between the pinning magnetic layer and the free magnetic layer, said head device further comprising:

a control element provided in proximity of the spin-valve MR element for correcting the magnetizing direction of the pinning magnetic layer;

wherein the control element is a conductive layer joined by an insulating layer to the free magnetic layer.

5. The device according to claim 1, wherein the control element includes a pair of electrodes for receiving from outside a current which generates a magnetic field to correct the magnetizing direction of the pinning magnetic layer.

6. The device according to claim 5, wherein one of the paired electrodes is connected to a common grounded electrode of the spin-valve MR element.

* * * * *